United States Patent [19]
Leitch

[11] Patent Number: 6,002,342
[45] Date of Patent: Dec. 14, 1999

[54] COMMUNICATION SYSTEM AND DEVICE HAVING UNIT LOCATING FEATURE

[75] Inventor: Clifford Dana Leitch, Coral Springs, Fla.

[73] Assignee: Motorola, Inc., Schaumburg, Ill.

[21] Appl. No.: 08/976,044

[22] Filed: Nov. 21, 1997

[51] Int. Cl.[6] .................................................. H04L 23/00
[52] U.S. Cl. .................................... 340/825.44; 375/377
[58] Field of Search .................................. 375/356, 358, 375/359, 371, 377; 340/825.44, 825.49, 825.54; 342/398, 442, 367

[56] References Cited

U.S. PATENT DOCUMENTS

| | | | |
|---|---|---|---|
| 3,680,121 | 7/1972 | Anderson et al. | 343/112 TC |
| 4,816,783 | 3/1989 | Leitch | 332/41 |
| 5,010,343 | 4/1991 | Anderson | 342/432 |
| 5,095,500 | 3/1992 | Tayloe et al. | 379/32 |
| 5,128,665 | 7/1992 | Deluca et al. | 340/825.47 |
| 5,327,144 | 7/1994 | Stilp et al. | 342/387 |
| 5,379,047 | 1/1995 | Yokev et al. | 342/457 |
| 5,555,183 | 9/1996 | Willard et al. | 340/825.21 |

*Primary Examiner*—Amanda T. Le
*Assistant Examiner*—Dac Vinh Ha
*Attorney, Agent, or Firm*—Keith A. Chanroo; Peter Hernandez

[57] ABSTRACT

A communication system (700) comprises a plurality of base sites (702–708) which include a first antenna (712) for transmitting a synchronous communication protocol such as a paging protocol and a second antenna (714) for transmitting a rotating phase signal. A communication device (250) takes the synchronous communication protocol and develops a reference signal (220) from the received protocol. The communication device (250) takes the reference signal (220) and the received rotating phase signal (214) and uses a phase detector (216) to produce a phase difference signal (232) which is substantially equal to the angle of the communication device (250) with respect to the particular base site (702–708) which transmitted the signals. In order to determine the location of the communication device at least two such phase difference signals (232), one phase difference signal from at least two different base sites is determined. In the preferred embodiment, the phase difference signals (232) are transmitted by the communication device (250) to a paging system controller (710) for calculation of the proximate location of the communication device (250).

11 Claims, 3 Drawing Sheets

COMMUNICATION SYSTEM AND DEVICE HAVING UNIT LOCATING FEATURE

FIELD OF THE INVENTION

This invention relates in general to communication systems and devices, and more specifically to a radio communication system and device having a unit locating feature.

BACKGROUND OF THE INVENTION

It is useful in many communication systems, for example paging systems, to know the location of the portable units or pagers which are operating within the system. The location or position information of the remote units for example can be used for registration and directed delivery of messages to the units or to locate a user in case of an emergency situation.

Prior schemes for locating portable communication devices have relied on one of several possible technologies, all having disadvantages for portable communication unit applications such as paging systems.

In one prior art system, the system computes arrival times of portable-to-base transmissions using direct frequency spread spectrum techniques. The position of the portable unit can be computed when arrival times at three or more receiver sites are known. The main disadvantage of this system is that it requires the use of complex spread spectrum transmitters at the portable device, and must operate in the Industrial, Scientific, and Medical (ISM) bands and accept any interference present in these frequency bands which are unlicensed.

In a second prior art system, the portable units incorporate a LORAN or GPS (global positioning system) receiver to compute its position. The portable units then report their position information to the system. The main disadvantage with this system is that it requires the added cost of integrating a LORAN or GPS receiver in the portable units, which adds further cost and complexity to the portable units. Not to mention that it also forces the portable units to be larger in size in order to accommodate the additional LORAN or GPS circuitry.

A third prior art communication system uses direction finding equipment at each base site in order to fix the location of the portable unit. The position of the portable units are computed by triangulation when two or more base stations receive the same signal. The disadvantage to this system is that the portable units have to transmit for long time periods at high power levels in order to enable accurate measurements of angles by the base stations. Such high power and long duty cycle transmissions would not be effective for small portable communication device applications (e.g., two way paging, etc.) since battery life in these applications is very important.

A fourth prior art communication system known as very high-frequency omnidirectional range (VOR) which is used primarily as a navigation aid for aircraft compares the phase of a fixed and rotating signal to compute its angle with respect to a transmitter station. In a VOR system, a transmitter emits a (variable) modulation whose phase relative to a reference modulation is different for each bearing of the receiving point from the station. A main drawback to a VOR system for use in portable communication applications is that the VOR transmitter(s) have to provide both a reference modulation signal and a variable modulation signal. The typical radio frequency (RF) bandwidth required for a VOR system is around 25 kilohertz (Khz). Such a large bandwidth requirement would be unacceptable for use in a two-way paging or other similar type of portable subscriber application. A need thus exists for a communication system and device which can provide for low cost location of communication devices such as pagers, radiotelephones, etc.

DESCRIPTION OF THE PREFERRED EMBODIMENT

Figure 1:
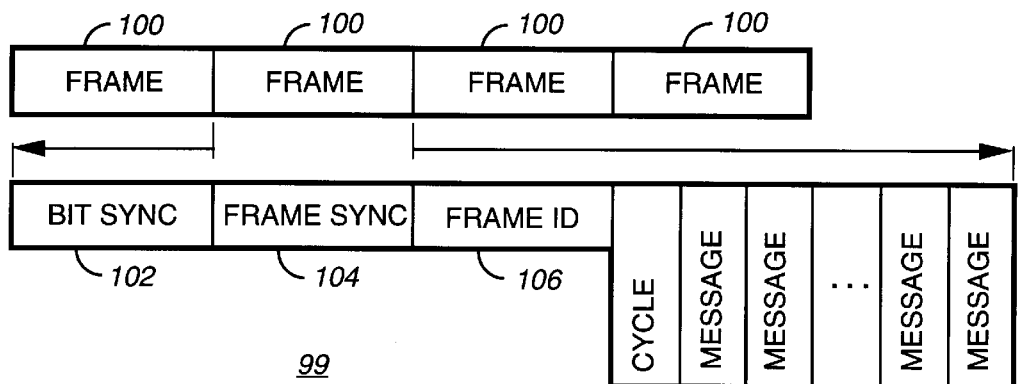
FIG. 1 illustrates a synchronous signal which is received by the portable communication device in accordance with the preferred embodiment of the present invention.

The present invention transmits a special signal from at least two of the communication system's base sites that the portable unit can use to determine its angle with respect to the base sites. The portable unit then computes its angle with respect to the two or more base sites and reports these angles back to the communication system. The system can then computes the portable's location by conventional triangulation techniques. The principle of operation of the present invention has some similarities to the previously mentioned VHF Omnidirectional Range (VOR) systems in that the portable unit compares the phase of a fixed and rotating signal to compute its angle with respect to a transmitter station. The method proposed here for pager and other portable use is however quite different from the VOR system in several respects.

In a typical prior art VOR system, a fixed 30 Hz reference signal is frequency modulated (±480 Hz) onto a 9960 Hz subcarrier. The transmitting antenna radiates in a cardiod pattern that rotates at 30 revolutions/sec, imposing 30 Hz amplitude modulation on the signal. The airborne receiver computes angles as a function of the phase difference between the AM and FM modulation components. In the VOR system no information is sent back to the base transmitter. An aircraft using the VOR system uses the bearings from 2 VOR stations to compute his position by triangulation. As mentioned previously, the typical RF bandwidth for such a system is around 25 (Khz) in order to transmit the FM subcarrier for the phase reference signal and the AM signal for the rotating signal.

Communication systems such as some paging systems have an inherent reference signal provided by frame sync and symbol sync provided within their paging communication protocols which the present invention uses. In these systems, only a rotating phase element would be needed to compute an angle at the portable receiver. The preferred embodiment of the present invention has three main components. The first component is a time base reference which is provided by the transmitted signal which is received by the portable devices. In the case of the preferred embodiment, this time reference is provided by synchronous communication signals transmitted by the system, in particular, the synchronous paging protocol which is received by the portable devices (e.g., two-way pagers).

The second main component of the present invention is a rotating phase signal which is transmitted by the communication system's base sites. Thirdly, the portable unit detects the directional information provided by two or more base sites and returns this information back to the system, allowing the system (e.g., system controller) to compute the location of that particular portable unit. Alternatively, the portable unit can compute and display its own position to the portable unit user via the portable unit's display.

In the preferred embodiment, a time base reference signal, $f_r$, can be chosen to be a convenient multiple of the paging protocol's frame rate. In the case of a paging system, the reference signal can be a convenient multiple of the frame rate of the associated paging transmission. For example, for paging transmissions using the well known FLEX™ (trademarks of Motorola, Inc.) paging protocol, paging transmissions have a frame length of 1.875 seconds and a timing reference synchronized to the frame rate is maintained in the pager as an integral part of the FLEX™ protocol using the frame sync signals. Using the 1.875 second frame length, the frame frequency is 1/1.875= 0.533333 Hertz (Hz). The reference signal frequency could be chosen to be the 60th harmonic of 0.533333 Hz which is 32 Hz. A more detailed discussion of how to synchronize to synchronous communication signals such as a synchronous (paging) communication protocol can be found in U.S. Pat. No. 5,555,183, entitled "Method and Apparatus For Synchronizing to a Synchronous Selective Call Signal", assigned to the present assignee, and which is hereby incorporated by reference.

FIG. 1 shows a synchronous paging signal 99 in accordance with the preferred embodiment of the present invention. The signal comprises a number of message packets or frames 100. Each frame cycle is preferably four minutes in duration, includes 128 frames per frame cycle and has a preferred base data rate of 1600 bits per second, although it will be appreciated that other data rate can be utilized. Additionally, each frame comprises a bit sync signal 102, preferably 32 bits of alternating 1,0 patterns, followed by a frame sync signal 104 preferably one of several predetermined thirty-two bit words, and a frame ID signal 106, preferably one thirty-two bit word having twenty-one variable information bits containing information such as a frame identification number. The bit sync signal 102 provides for selective call receiver bit synchronization while the frame sync signal 104 provides for frame synchronization and may include a signal indicative of the data rate of the message information following the frame ID signal 106. The frame ID signal 106 indicates the number of the frame. Each frame is numbered in a preferred sequence from 0 to 127 in a signaling system having one hundred and twenty eight frames. Alternately, any number of frames may be used in the system, however $2^N$ frames (where N is an integer) is preferred.

Following frame ID 106 is a word 108 having a cycle value and a plurality of message words 110 follow thereafter. Words 108–110 are, preferably, (31,21) BCH code (Bose, Chaudhuri, Hocquenghem code) words having twenty-one information bits and ten parity bits generated according to the well known BCH algorithm. An additional even parity bit extends the word to a (32,21) code word. Messages within words 110 comprise at least one message having an address signal and optional information signals associated with the address signal. Preferably, all of the address signals within the frame are located in a first portion and the information signals are located in a subsequent portion of the frame. It is well known to those skilled in the art how the locate addresses in a first portion and message information in a second portion of a frame. Additionally, U.S. Pat. No. 5,128,665 to DeLuca et al., assigned to the assignee of the present invention shows an improved method of locating addresses as in a first portion and message information in a subsequent portion of a signal. Word 108 includes the cycle value which forms the indicating frames in which a selective call receiver is to decode message information as will be discussed below. In a paging system having $2^N$ frames, the cycle value occupies an N bit word 108. The remaining bits may contain a boundary signal indicating a boundary between the address and information signals in words 110. Words 108–110 are shown in a vertical orientation to indicate that these words may be interleaved in order to improve the immunity of the transmission to burst errors. Preferably words 108–110 comprise 18 blocks of words wherein each block contains 8 interleaved words. In an alternate embodiment the interleaving may be modified or eliminated.

Figure 2:
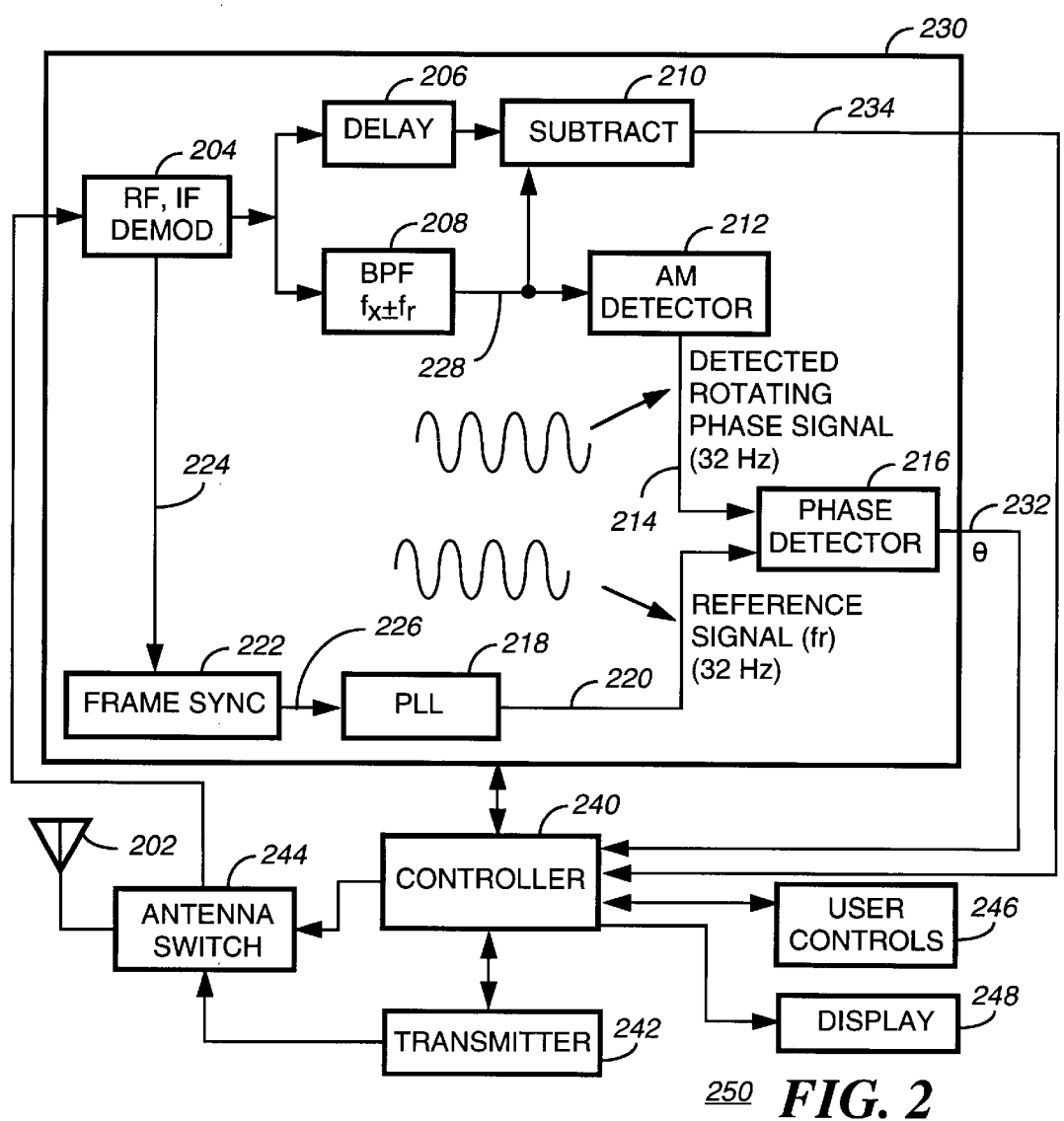
FIG. 2 shows a block diagram of a communication device in accordance with the preferred embodiment of the invention.

Referring now to FIG. 2, a block diagram of a communication device such as a two-way pager 250 in accordance with the preferred embodiment of the invention is shown. Radio frequency signals such as signal 99 are received by antenna 202 and demodulated using conventional receiver circuitry 204. A frame synchronizer 222 receives the demodulated received signal and synchronizes to the frame sync signal 104 and provides a frame synch reference signal 226 to a phase-locked-loop (PLL) 218. The PLL 218, or equivalent circuitry as known in the art, generates a 32 Hz reference signal waveform (60th harmonic of the paging protocol's frame frequency) 220 which is phase locked with the frame sync reference signal 226.

Figure 3:
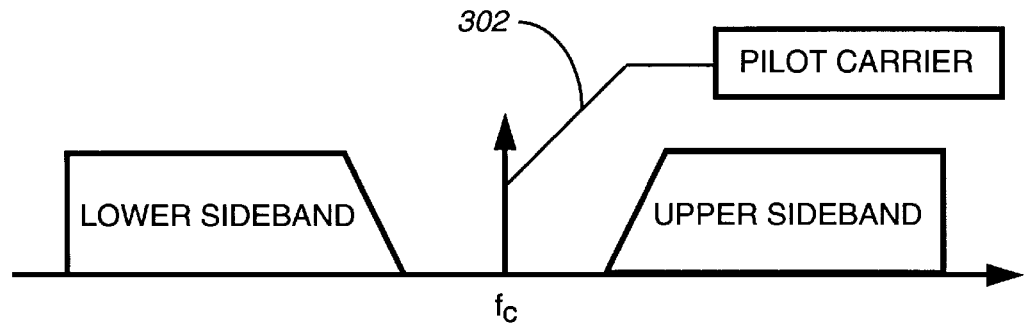
FIG. 3 shows a transmitted frequency spectrum of a QAM or SSB transmission.

There are many possible ways the rotating signal mentioned above could be encoded and transmitted which can be used in the present invention. A preferred method which is integrated with a linear QAM (quadrature amplitude modulated) or single side band (SSB) transmission is shown in FIG. 3. Several known methods of QAM or SSB transmission include a pilot carrier 302 transmitted to serve as a gain and phase reference for the pager 250. A discussion of QAM transmission can be found in U.S. Pat. No. 4,816,783, entitled "Method and Apparatus for quadrature modulation", assigned to the assignee of the present invention and which is hereby incorporated by reference. These systems have a transmitted frequency spectrum, centered on the carrier frequency, $f_c$, as shown in FIG. 3.

Figure 4:
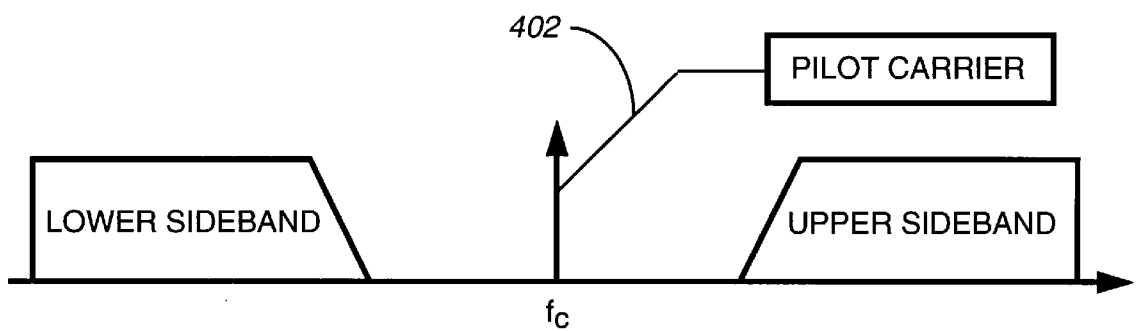
FIG. 4 shows a transmitted frequency spectrum which is capable of accommodating a rotating phase signal in accordance with the invention.

To accommodate the rotating phase signal of the present invention, the upper and lower sidebands shown in FIG. 3 are moved farther from the pilot carrier, as shown in FIG. 4. The pilot carrier 402 can be represented by the equation, A cos(2 $\pi f_c$ t), where:

A=pilot carrier amplitude;

$f_c$=carrier frequency;

t=time.

Figure 5:
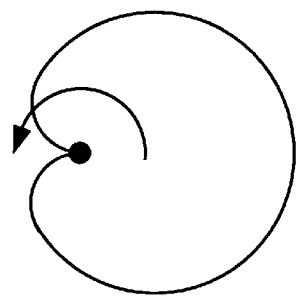
FIG. 5 shows a cardiod radiation pattern of the rotating phase signal in accordance with the preferred embodiment.

The rotating phase signal mentioned above is preferably transmitted from a second transmitting antenna, coaxial with the main paging transmission antenna, that rotates synchronously, at a rate of, $f_r$, revolutions/second, with the previously defined reference frequency. The rotation may be accomplished by either mechanical or electrical phasing methods known in the art. The radiation pattern of the second rotating antenna is preferably a cardiod, as shown in FIG. 5.

The signal applied to the rotating antenna is described by the equation:

$$B \cos(2\pi f_c t + 2\pi f_x t) + B \cos(2\pi f_c t - 2\pi f_x t),$$

where:

B=amplitude of the rotating phase signal;

$f_x$=an offset frequency, being the frequency difference between the pilot carrier and the rotating phase signal, preferably centered on portion cleared as a result of moving out the sidebands.

Figure 6:
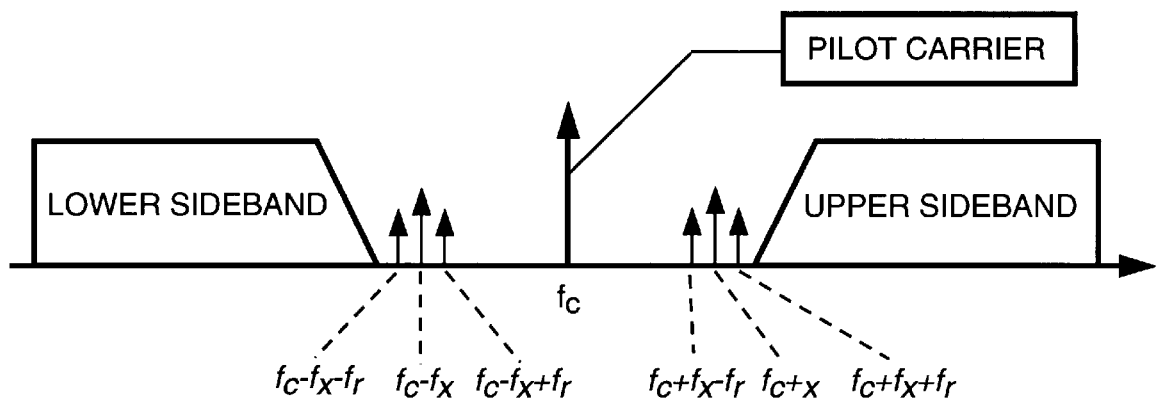
FIG. 6 shows a transmitted frequency spectrum as shown in FIG. 4 including the rotating phase signal in accordance with the preferred embodiment.

The rotation of the second antenna causes sinusoidal amplitude modulation of the rotating phase signal as seen by the receiver 230. The received rotating phase signal is:

$$\{1+\cos(\theta)\}\{B \cos(2\pi f_c t + 2\pi f_x t) + B \cos(2\pi f_c t - 2\pi f_x t)\},$$

where, θ=angle (bearing) of receiver with respect to transmitting antenna. The spectrum of the received signal now looks like that shown in FIG. 6.

Referring back to FIG. 2, after conventional demodulation in the receiver section 204, the rotating signal will appear in the baseband of the demodulator's output 224. A bandpass filter 208 centered on $f_x$ separates the rotating phase signal from the other components of the demodulated signal 224. The recovered rotating phase signal 228 is then subtracted, using a conventional subtraction circuit 210, from the demodulated signal 224 that has been delayed by a conventional delay circuit 206 to compensate for the delay in the bandpass filter (BPF). The resulting signal 234 can then be processed as a conventional paging signal.

The recovered rotating phase signal 228 is also applied to an amplitude modulation (AM) detector 212 to recover the sinusoidal amplitude modulation resulting from rotation of the directional (cardiod pattern) transmitting antenna. The AM signal 214 and the reference signal 220 from the PLL are applied to a conventional phase detector 216. The output signal produced by the phase detector 216 is proportional to the phase difference between the two signals, and that phase difference signal 232, θ, is substantially equal to the angle (bearing) of the receiver with respect to that particular transmitting antenna (one of the base sites 702–708 see FIG. 7).

The two-way pager or two-way radio 250 further comprises a controller 240 which can be implemented using one of a number of microprocessors or microcontrollers or other equivalent hardware circuitry known in the art. The controller 240 controls the overall operations of pager 250. A set of user controls 246 such as switches allow the user to control the operation of pager 250. A display 248 coupled to the controller 240 presents received messages or other user information to the pager user. In accordance with one aspect of the invention, a transmitter 242 transmits back to the paging system controller 710 (see FIG. 7) the phase difference signals determined from signals transmitted from at least two of the base sites in order for the paging system controller 710 to be able to locate the pager 250. An antenna switch 244 selectively couples antenna 202 between receiver 230 and transmitter 242.

Figure 7:
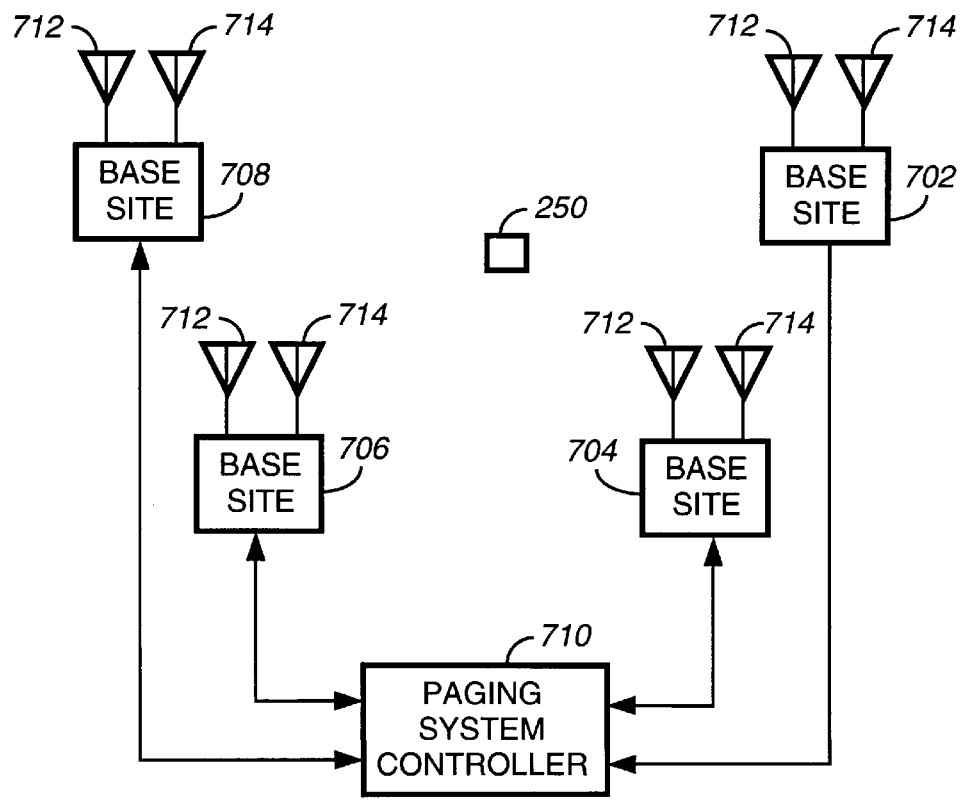
FIG. 7, shows a diagram of a communication system in accordance with the invention.

Preferably, the angle (θ), is measured for at least two of the base sites 702–708 in the communication system shown in FIG. 7 in order to be able to triangulate the position of the pager 250. In the preferred embodiment, the communication system 700 comprises a plurality of base sites 702–708, which transmit signals to communication device 250. Each of the base sites 702–708 preferably include receiver and transmitter sections. A system controller 710 controls which of the base sites 702–708 will transmit signals to the pager 250. In order to determine the location of the communication device 250, the system controller 710 for example will transmit the appropriate signals mentioned above to communication device 250 through two or more of the base sites 702–708.

Each of the base sites 702–708 includes a first antenna 712 for transmitting the paging protocol signals which provides the synchronous communication signals in the preferred embodiment, and a second antenna 714 for providing the rotating phase signal. As mentioned previously, the second antenna 714 is preferably located coaxial to the first antenna for best performance, although the antennas do not have to be coaxially located as long there are located in close proximity to each other. The second transmitting antenna 712 714 rotates synchronously at a defined reference frequency.

In practice, the system controller 710 would as one example send a first set of signals first through base site 702, wait for the angle information determined by pager 250 as discussed previously above to be transmitted back, and then transmit a new set of signals to the communication device 250 via base site 704. After the communication device 250 determines the angle information based on the signals transmitted by the second base site 704, the system controller 710 calculates the position of the portable device using well known triangulation techniques.

The system controller 710 can then use the angle information calculated from signals transmitted from the at least two base sites, for example, base sites 702 and 704 to locate the portable device 250, as for example, in an emergency situation, or it can relay the position information back to the portable device 250 so that the portable device user can know his/her location. As an alternative embodiment, the portable unit, knowing the coordinates of each the transmitting sites 702–708 which could be stored in the portable unit's memory, can compute its own position and display it to the user without the need to send the angle information back to the system controller 710. This would be useful in order to provide location information to users of one-way (receive only) pagers.

As compared to the prior art systems previously discussed, the current invention does not require the use of spread spectrum transmitters or the use of separate LORAN or GPS receiver sections. The present invention also does not require the transmission of separate direction finding information since in the present invention the direction finding signals are transmitted within the normal bandwidth of the portable units. Finally, compared to the previously mentioned prior art triangulation systems, the present invention does not need to use high power or long transmissions in the portable in order to calculate the unit's position.

An additional advantage of the preferred embodiment is that very little bandwidth is required for transmission of the rotating phase signal and most of the available bandwidth of each transmission can be retained for the primary data or voice transmission(e.g., paging messages, etc.). In the example discussed above, the bandwidth required for direction finding is 128 Hz, adding 50% for guard band yields 192 Hz, which is only 3% of a typical 6250 Hz subchannel.

The present invention also takes advantage of the fact that the paging protocol provides synchronous communication signals which are used by the pager 250 of the present invention to provide the required phase reference signal 220 which can be used to determine the phase difference signal 232. Since the phase reference signal 220 is derived from the existing paging protocol frame sync, less power and bandwidth are required to provide the locating feature. This can be compared to a VOR system which has to transmit an explicit phase reference signal and will typically require approximately a 25 Khz bandwidth to perform its locating functions. The present invention using the pilot carrier provides a gain and phase reference which can cancel the signal distortion effects of fading thus allowing the system to operate in urban multipath environments.

While the preferred embodiments of the invention have been illustrated and described, it will be clear that changes, variations, substitutions and equivalents will occur to those skilled in the art without departing from the spirit and scope of the present invention as defined by the appended claims. For example, although the preferred embodiment has been described in terms of a paging system using a paging protocol which provides the synchronous communications signals, other communication systems which use communication protocols such as two-way radio systems, radio telephone systems, etc. can also take advantage of the present invention.

What is claimed is:

1. A communication system, comprising:
    a base site having a first antenna for transmitting a synchronous communication protocol and a second antenna for transmitting a rotating phase signal; and
    a portable communication device including: 'a receiver section for receiving the synchronous communication protocol from the base site and generating a reference signal, the receiver section also receives the rotating phase signal from the base site; and
       a receiver section for receiving the synchronous communication protocol from the base site and generating a reference signal, the receiver section also receives the rotating phase signal from the base site; and
       a phase detector coupled to the receiver section for calculating the phase difference between the reference signal and the rotating phase signal and producing an output signal ($\theta$).

2. A communication system as defined in claim 1, wherein the synchronous communication protocol transmitted by the base site comprise a paging protocol.

3. A communication system as defined in claim 1, wherein the second antenna comprises a rotating antenna.

4. A communication system as defined in claim 1, wherein the output signal ($\theta$) is substantially equal to the angle between the portable communication device and the base site.

5. A communication system as defined in claim 4, further comprising a system controller coupled to the base site, and the portable communication device further comprises a transmitter coupled to the phase detector for transmitting the output signal ($\theta$) to the system controller.

6. A communication system as defined in claim 1, wherein the rotating phase signal is transmitted using a single sideband (SSB) signal which includes a pilot carrier which serves as a gain and phase reference for the portable communication device.

7. A communication system as defined in claim 1, wherein the rotating phase signal is transmitted using a quadrature amplitude modulated (QAM) signal which includes a pilot carrier which serves as a gain and phase reference for the portable communication device.

8. A portable communication device which receives a synchronous communication protocol and a rotating phase signal transmitted by a remote base site, comprising:
    a receiver section for receiving the synchronous communication protocol and generating a reference signal from said synchronous communication protocol;
    an amplitude modulation detector responsive to the received rotating phase signal for providing an amplitude modulated (AM) signal; and
    a phase detector responsive to the reference signal and the AM signal calculates a phase difference between the reference signal and the AM signal and produces a phase difference signal ($\theta$) which is substantially equal to the angle between the portable communication device and the remote base site.

9. A portable communication device as defined in claim 8, wherein the portable communication device comprises a pager and the synchronous communication protocol comprises a paging protocol having frame sync signals.

10. A portable communication device as defined in claim 9, wherein the receiver section further comprises:
    a frame synchronizer coupled to the receiver section which synchronizes to the frame sync signals and provides a frame synch reference signal; and
    a phase-locked-loop which in response to the frame synch reference signal generates the reference signal.

11. A portable communication device as defined in claim 9, wherein the pager further comprises a transmitter for transmitting the phase difference signal ($\theta$).

* * * * *